United States Patent
Teshuva et al.

(10) Patent No.: US 9,942,902 B2
(45) Date of Patent: Apr. 10, 2018

(54) METHOD AND SYSTEM FOR ACCESSING A WIRELESS COMMUNICATION NETWORK USING A NAVIGATION ROUTE OF USER EQUIPMENT

(71) Applicant: MOTOROLA SOLUTIONS, INC., Schaumburg, IL (US)

(72) Inventors: Ran Teshuva, Hertzelia (IL); Eitan Koren, Raanana (IL); Gabi Ofir, Reshon Letzion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 95 days.

(21) Appl. No.: 14/929,698

(22) Filed: Nov. 2, 2015

(65) Prior Publication Data
US 2017/0127401 A1 May 4, 2017

(51) Int. Cl.
*H04W 72/04* (2009.01)
*H04W 4/02* (2018.01)

(52) U.S. Cl.
CPC ......... *H04W 72/048* (2013.01); *H04W 4/025* (2013.01)

(58) Field of Classification Search
CPC . H04W 72/048; H04W 72/08; H04W 72/087; H04W 4/025
See application file for complete search history.

(56) References Cited

U.S. PATENT DOCUMENTS

| | | | |
|---|---|---|---|
| 5,697,059 A | 12/1997 | Carney | |
| 6,134,230 A * | 10/2000 | Olofsson | H04W 28/18 370/337 |
| 8,457,591 B2 | 6/2013 | Lambert et al. | |
| 8,467,330 B2 * | 6/2013 | Gopalakrishnan | H04W 72/1226 370/315 |
| 8,594,684 B2 | 11/2013 | Miller et al. | |
| 8,874,136 B2 | 10/2014 | McDonald et al. | |
| 9,363,788 B2 * | 6/2016 | Zhang | H04W 72/005 |
| 2002/0168944 A1 * | 11/2002 | Terry | H04L 1/0009 455/67.11 |
| 2004/0166886 A1 * | 8/2004 | Laroia | H04B 7/0491 455/522 |
| 2010/0240385 A1 * | 9/2010 | Lohr | H04W 36/0072 455/452.2 |
| 2012/0250603 A1 * | 10/2012 | Huang | H04W 72/1257 370/315 |
| 2012/0263120 A1 * | 10/2012 | Gopalakrishnan | H04W 72/1226 370/329 |

(Continued)

*Primary Examiner* — Habte Mered
(74) *Attorney, Agent, or Firm* — Michael Best & Friedrich LLP

(57) ABSTRACT

A method and apparatus for operating a communication system that includes a plurality of base stations. The method includes receiving a route, the route including an array of locations and times. The method further includes determining a plurality of modulation schemes by determining at least one modulation scheme for each of the plurality of base stations. The method further includes determining a quality of service having a guaranteed bit rate. The method further includes determining an allocation scheme based on the route, at least one of the plurality of modulation schemes, and the guaranteed bit rate. Wherein determining the allocation scheme includes allocating an amount of resources such that a consumed bit rate is substantially constant with respect to the guaranteed bit rate.

20 Claims, 10 Drawing Sheets

(56) References Cited

U.S. PATENT DOCUMENTS

| | | | |
|---|---|---|---|
| 2013/0329598 A1* | 12/2013 | DiFazio | H04W 64/003 370/254 |
| 2014/0067257 A1* | 3/2014 | Dave | G01C 21/3461 701/423 |
| 2015/0063122 A1* | 3/2015 | Chiang | H04L 45/24 370/238 |
| 2016/0270102 A1* | 9/2016 | Zeng | H04W 72/1231 |

* cited by examiner

METHOD AND SYSTEM FOR ACCESSING A WIRELESS COMMUNICATION NETWORK USING A NAVIGATION ROUTE OF USER EQUIPMENT

BACKGROUND OF THE INVENTION

Existing methods and systems for accessing wireless communication networks allocate resources to a communication link between the network infrastructure (e.g., a base station) and a mobile communication device (e.g., a smart telephone, a two-way radio, and the like (sometimes generically referred to as "user equipment")). To help maintain a required quality of service (QoS) for communications with a particular user device, the resources are allocated according to an allocation scheme.

In a public safety domain, to ensure a suitable user experience, the quality of service is typically set by the network infrastructure (e.g., a base station) and is unchanged during service. A modulation scheme is used to modulate the carrier signal of the communication link. Certain modulation schemes require a greater number of resources to maintain the quality of service, than other modulation schemes. In existing systems, the air interface bit rate (e.g., the bit rate of the communication link between the user device and the base station) must match the bit rate consumed by an application of the user device at all times in order to maintain the required quality of service.

These aspects of wireless communications may be better understood by reference to the communication system 10 shown in FIG. 1A. The communication system 10 includes a plurality of base stations 15a, 15b, 15c, 15d, and 15e configured to provide access to a network. A mobile communication device 18 may travel along a route 20 having an array of location points 25a, 25b, 25c, 25d, and 25e. While traveling along the route 20, the mobile communication device 18 enters and exits a plurality of coverage areas 30a, 30b, 30c, 30d, and 30e of the base stations 15a, 15b, 15c, 15d, and 15e. As illustrated, when at point 25a, the mobile communication device 18 is within the coverage area 30a, when at point 25b, the mobile communication device 18 is within the coverage area 30b, etc. A different modulation scheme may be used in each of the different coverage areas 30a, 30b, 30c, 30d, and 30e. For example, coverage area 30a may use, for example, a sixty-four quadrature amplitude scheme (QAM) scheme, while coverage area 30b uses a sixteen quadrature amplitude scheme (QAM) scheme, coverage area 30c uses a four quadrature phase-shift keying (QPSK) scheme, coverage area 30d uses a sixteen quadrature amplitude scheme (QAM) scheme, and coverage area 30e uses a sixty-four quadrature amplitude scheme (QAM) scheme.

FIG. 1B is a graph illustrating an allocation scheme 50 of the communication link between the plurality of bases stations 15a, 15b, 15c, 15d, and 15e and the mobile communication device 18, while travelling along the route 20. As illustrated, in order to meet the required quality of service (QoS) (e.g., a guaranteed bit rate of the quality of service (QoS), such as a predetermined uplink data rate and a predetermined downlink data rate), the wireless communications system 10 allocates resources in real time so that the air interface bit rate and the bit rate consumed by an application of the mobile communication device 18 are matched. Therefore, in the communication network 10, in order to meet the quality of service (QoS), more resources must be allocated when using a low-efficiency modulation scheme, such as the four quadrature phase-shift keying (QPSK) scheme (e.g., at location points 25a and 25e, when the mobile communication device 18 is located within coverage areas 30a and 30e) rather than the sixteen quadrature amplitude (QAM) scheme (e.g., at location points 25b and 25d, when the mobile communication device 18 is located within coverage areas 30b and 30d). Additionally, more resources must be allocated when using the sixteen quadrature amplitude (QAM) scheme than a high-efficiency modulation scheme, such as the sixty-four quadrature amplitude (QAM) scheme (e.g., at location point 25c, when the mobile communication device 18 is located within coverage area 30c) and the allocation of resource in the communication system 10 is inefficient and may lead to resource starvation.

Accordingly, there is a need for methods and systems of accessing a wireless communication network using a navigation route of user equipment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
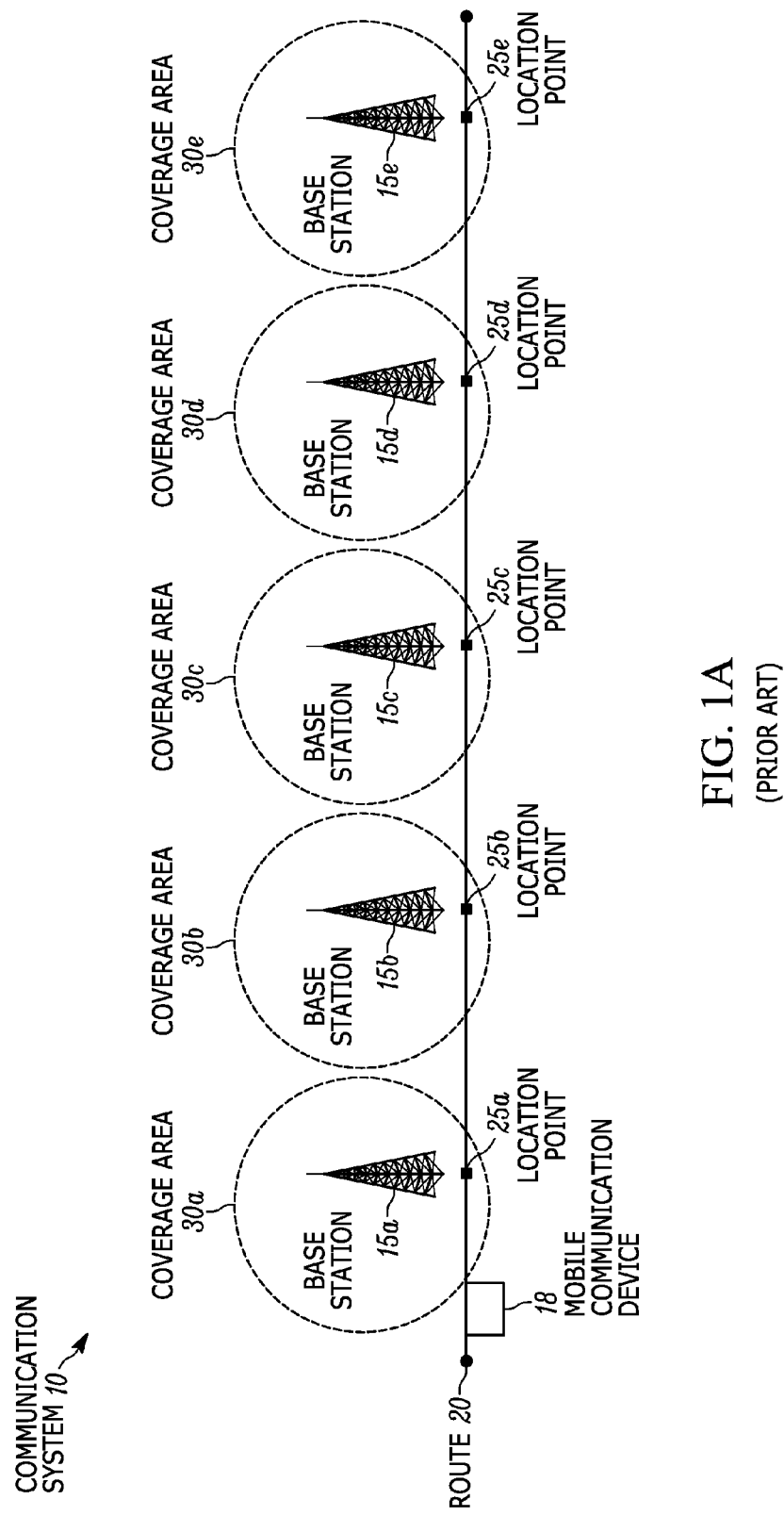
FIG. 1A is a block diagram of a known communication system including a plurality of base stations.
Figure 1B:
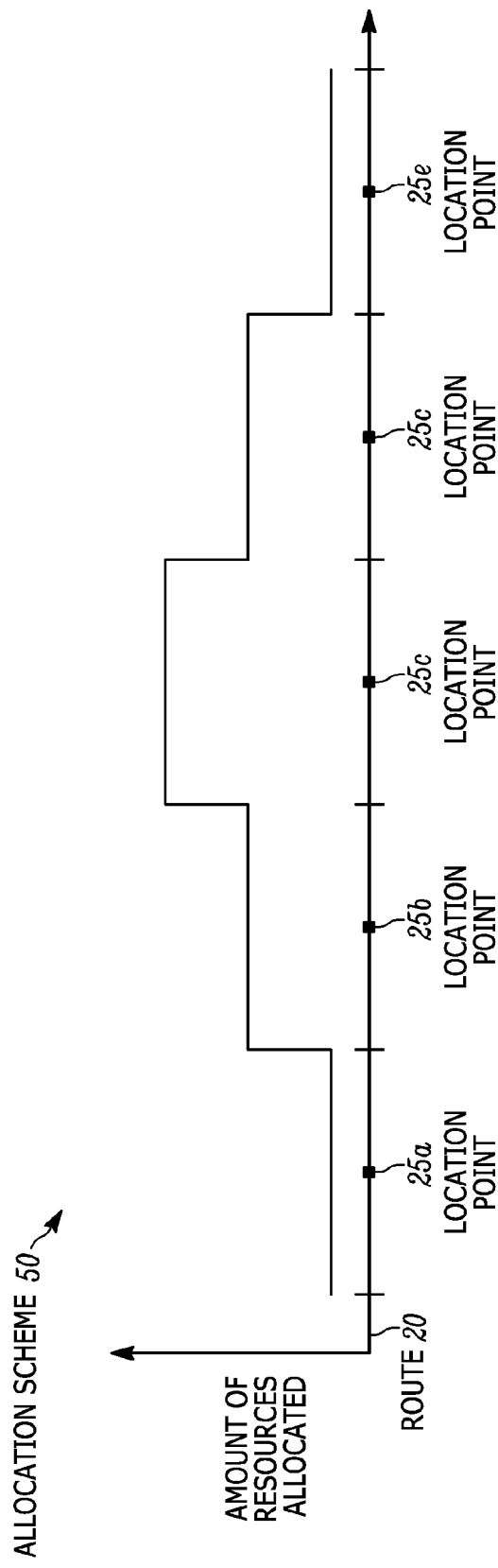
FIG. 1B is a chart illustrating a known allocation scheme used in conjunction with the known communication system of FIG. 1A.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method of operating a communication system that includes a plurality of base stations. In one example, the method includes receiving a route. The route includes an array of locations and times. The method further includes determining a plurality of modulation schemes by determining at least one modulation scheme for each of the plurality of base stations. The method further includes determining a quality of service having a guaranteed bit rate. The method further includes determining an allocation scheme based on the route, at least one of the plurality of modulation schemes, and the guaranteed bit rate. Determining the allocation scheme includes allocating an amount of resources such that a consumed bit rate is substantially constant with respect to the guaranteed bit rate. In some embodiments, the method improves resource management for a plurality of different kinds of network, including but not limited to a best-effort network.

Another embodiment provides, a non-transitory computer-readable medium containing instructions that, when executed by an electronic processor, perform a set of functions. The functions include receiving a route, the route including an array of locations and times. The functions further include determining a plurality of modulation schemes by determining at least one modulation scheme for each of the plurality of base stations. The functions further include determining a quality of service having a guaranteed bit rate. The functions further include determining an allocation scheme based on the route, at least one of the plurality of modulation schemes, and the guaranteed bit rate. Wherein determining the allocation scheme includes allocating an amount of resources such that a consumed bit rate is substantially constant with respect to the guaranteed bit rate.

Another embodiment provides, a communication network management controller including a transceiver, an electronic processor electrically coupled to the transceiver, and a memory electrically coupled to the electronic processor and containing instructions that, when executed by the electronic processor, perform a set of functions. The functions including receiving a route, the route including an array of locations and times. The functions further including determining a plurality of modulation schemes by determining at least one modulation scheme for each of the plurality of base stations. The functions further including determining a quality of service having a guaranteed bit rate. The functions further including determining an allocation scheme based on the route, at least one of the plurality of modulation schemes, and the guaranteed bit rate. Wherein determining the allocation scheme includes allocating an amount of resources such that a consumed bit rate is substantially constant with respect to the guaranteed bit rate.

Figure 2:
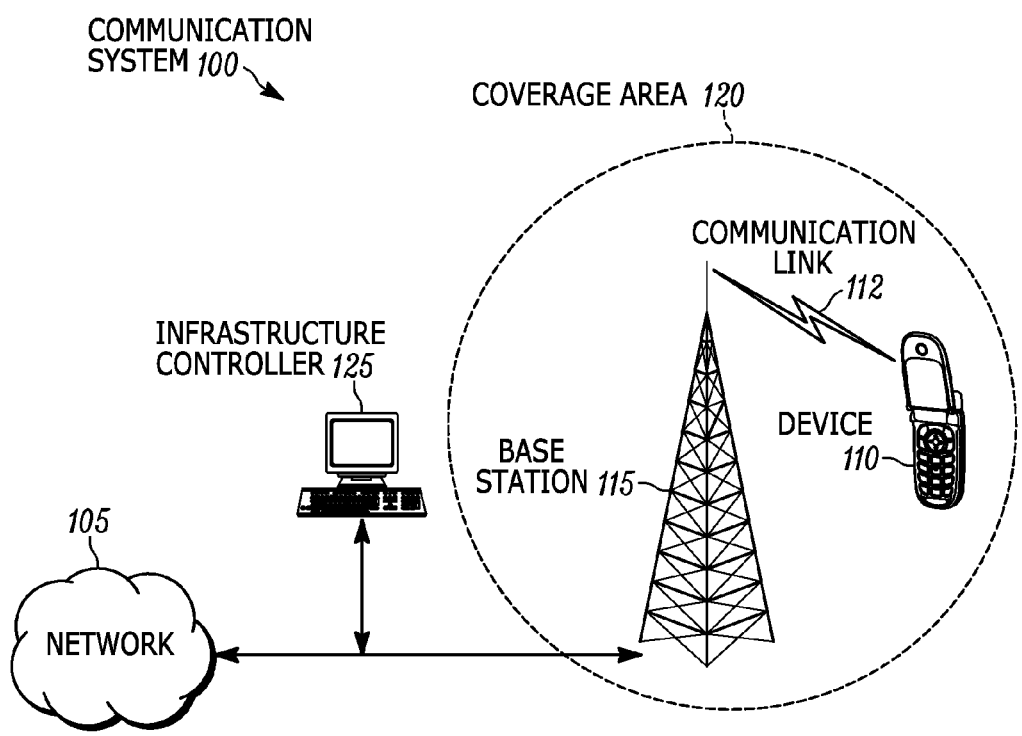
FIG. 2 is a block diagram of a communication system in accordance with some embodiments.

FIG. 2 is a block diagram of a communication system 100 for providing wireless access to a network 105. The network 105 may be supported by a variety of communication protocols including, without limitation, a Long-Term Evolution (LTE) protocol, a Long-Term Evolution (LTE) Advanced protocol, a Fifth Generation (5G) mobile protocol, a High-Speed Packet Access (HSP) protocol, an Evolved High-Speed Packet Access (EHSPA) protocol, a Third Generation (3G) protocol, an Enhanced Data rates for Global Evolution (EDGE) protocol, Television White Space (TVWS), or fixed or mobile Public Safety (PS) services at 4.9 Gigahertz (GHz). In an exemplary embodiment, the one or more networks 105 can be operated by a commercial service provider.

The network 105 can be accessed by one or more mobile communication devices 110 (sometimes generically referred to as "user equipment"). Each mobile communication device 110 is configured to access the network 105 via a communications link 112 between the mobile communication device 110 and one or more base stations 115. Each base station 115 has a communication range, or coverage area, 120. In some embodiments, the one or more base stations 115 are Evolved Node B (eNodeB) base stations used in conjunction with a Long-Term Evolution (LTE) protocol, or similar protocol. Exemplary devices suitable for use as one of the mobile communication devices 110 include, for example, two-way radios, smart telephones, laptop computers, tablet computers, and vehicle-based wireless communication devices.

A communication network management controller, such as an infrastructure controller 125, is communicatively coupled to the network 105 and the mobile communication device 110 (via the communications links 112 and the one or more base stations 115). The infrastructure controller 125 facilitates access to the network 105 by the mobile communication device 110. For example, the infrastructure controller 125, among other things, determines an allocation scheme of the system 100. The allocation scheme determines the amount of resources allocated to the communications link 112.

Figure 3:
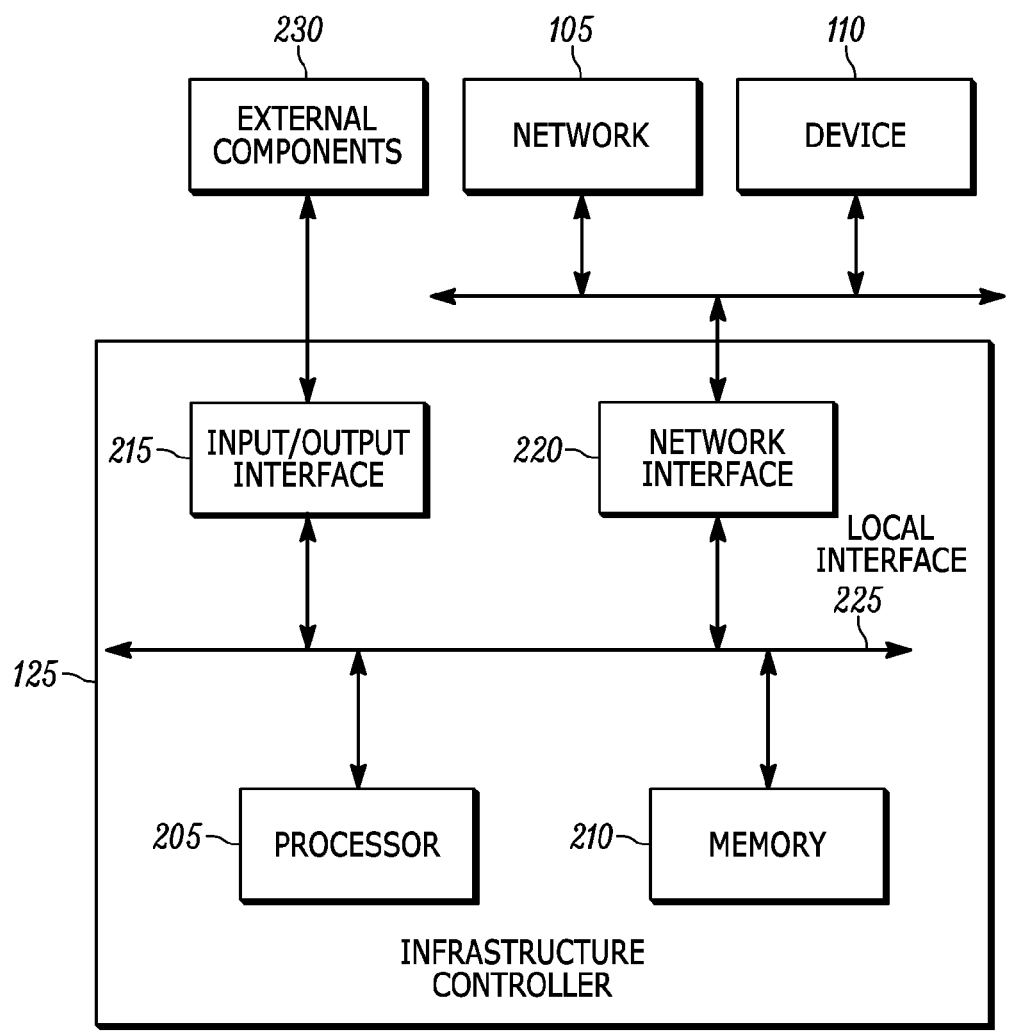
FIG. 3 is a block diagram of an infrastructure controller of the communication system of FIG. 2 in accordance with some embodiments.

FIG. 3 is a block diagram of an exemplary infrastructure controller 125, which may be used in the system 100 in accordance with some embodiments. Specifically, the infrastructure controller 125 can implement the various methods described herein. The infrastructure controller 125 is electrically and/or communicatively connected to a variety of modules or components. For example, the illustrated infrastructure controller 125 is connected to, among other things, the network 105 and the mobile communication device 110. In some embodiments, the infrastructure controller 125 includes a plurality of electrical and electronic components that provide power, operational control, communication, and protection to the components and modules within the infrastructure controller 125. For example, the infrastructure controller 125 includes an electronic processor 205, a memory 210, input/output (I/O) interface 215, and a network interface 220.

It should be appreciated by those of ordinary skill in the art that FIG. 3 depicts the infrastructure controller 125 in a simplified manner, and a practical embodiment may include additional components and suitably configured processing logic to support known or conventional operating features that are not described in detail herein. The components of the infrastructure controller 125 are communicatively coupled via a local interface 225. The local interface 225 may be, for example but not limited to, one or more buses or other wired or wireless connections. The local interface 225 may have additional elements, which are omitted for simplicity, such as controllers, buffers, drivers, repeaters, and receivers, that, among other things, enable communications. Further, the local interface 225 may include address, control, and/or data connections to enable appropriate communications among the aforementioned components.

The electronic processor 205 is a hardware device for executing software instructions. The electronic processor 205 may be a semiconductor-based microprocessor, or other similar device designed to execute software instructions. The memory 210 includes, for example, a program storage area and a data storage area. The program storage area and the data storage area can include combinations of different types of memory, such as read-only memory (ROM), random access memory (RAM) or other suitable magnetic, optical, physical, or electronic memory devices. The electronic processor 205 is connected to the memory 210 and executes software instructions that are capable of being stored in a random access memory (RAM) of the memory 210 (e.g., during execution), a read-only memory (ROM) of the memory 210 (e.g., on a generally permanent basis), or another non-transitory computer readable medium such as another memory or a disc. The software may include, one or more applications, program data, filters, rules, one or more program modules, and other executable instructions.

The input/output (I/O) interface 215 provides connections between the infrastructure controller 125 and external components 230 (e.g., a keyboard, a mouse, a touch pad, etc.). The input/output (I/O) interface 215 may be used to receive user input from and/or for providing system output to the external components 230.

The network interface 220 may be used to enable the infrastructure controller 125 to communicate to the network 105 and/or the mobile communication device 110 (via the communications link 112 and the one or more base stations 115). Communications to the network 105 and/or the mobile communication device 110 can be protected using one or more encryption techniques. The connections between the network interface 220 and the network 105 and/or the mobile communication device 110 are, for example, wired connections, wireless connections, or a combination of wireless and wired connections.

Figure 4:
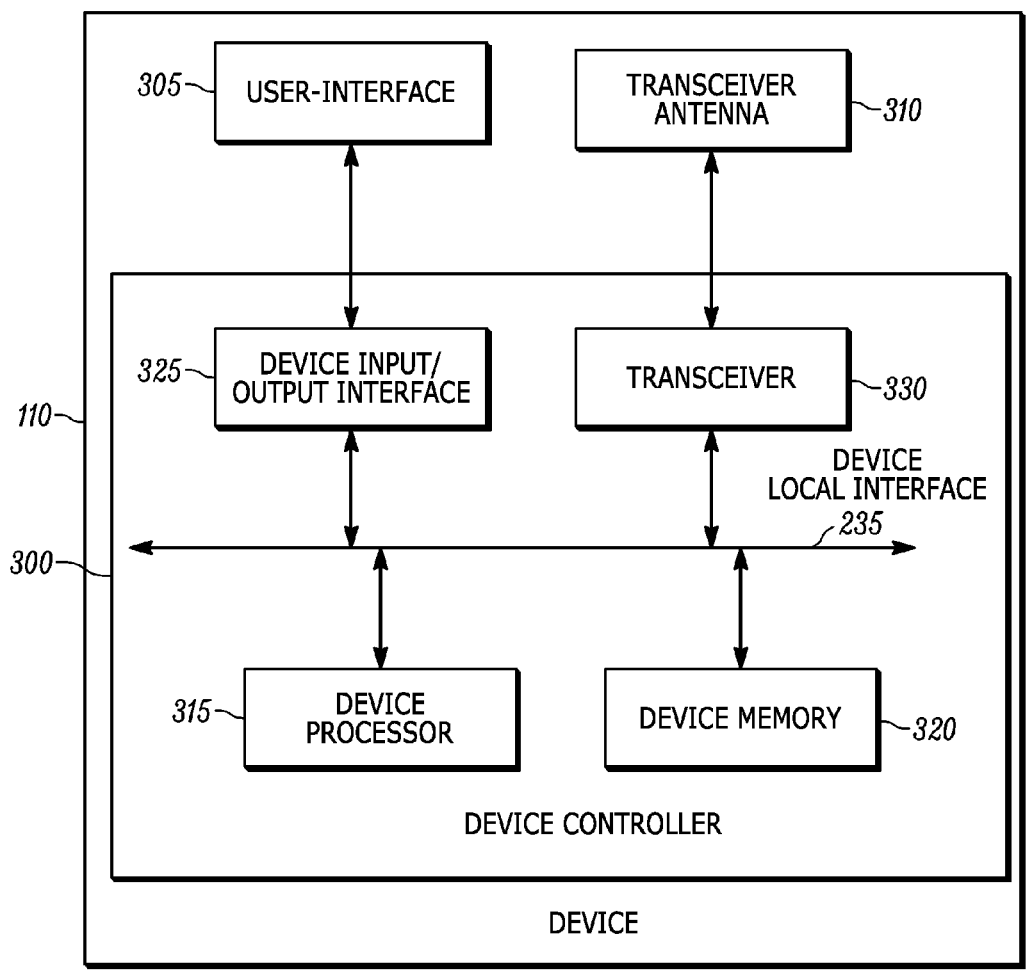
FIG. 4 is a block diagram of a device of the communication system of FIG. 2 in accordance with some embodiments.

FIG. 4 is a block diagram of one exemplary embodiment of the mobile communication device 110. The mobile communication device 110 includes, among other things, a device controller 300, a user-interface 305, and a transceiver antenna 310. The device controller 300 includes a device electronic processor 315, a device memory 320, a device input/output (I/O) interface 325, a transceiver 330, and a device local interface 335. In some embodiments, the device electronic processor 315, the device memory 320, the device input/output (I/O) interface 325, and the device local interface 335, are substantially similar to the electronic processor 205, the memory 210, the input/output (I/O) interface 215, and the local interface 225 of the infrastructure controller 125.

The user-interface 305 is communicatively coupled to the device controller 300 through the device input/output (I/O) interface 325. The user-interface 305 is used to receive user input and/or provide user output. The user-interface 305 includes a combination of digital and/or analog input and/or output devices, for example, output devices such as speakers and/or a display (e.g., a primary display, a secondary display, etc.) and input devices such as touch-screen displays, a plurality of knobs, dials, switches, buttons, etc.

The transceiver 330, along with the transceiver antenna 310, enables wireless communication from the mobile communication device 110 to, for example, the network 105 through the communications link 112 and the one or more base stations 115, as well as the infrastructure controller 125. In other embodiments, rather than a transceiver 330 and transceiver antenna 310, the device may include separate transmitting and receiving components, for example but not limited to, a transmitter, a transmitting antenna, a receiver, and a receiving antenna.

Figure 5A:
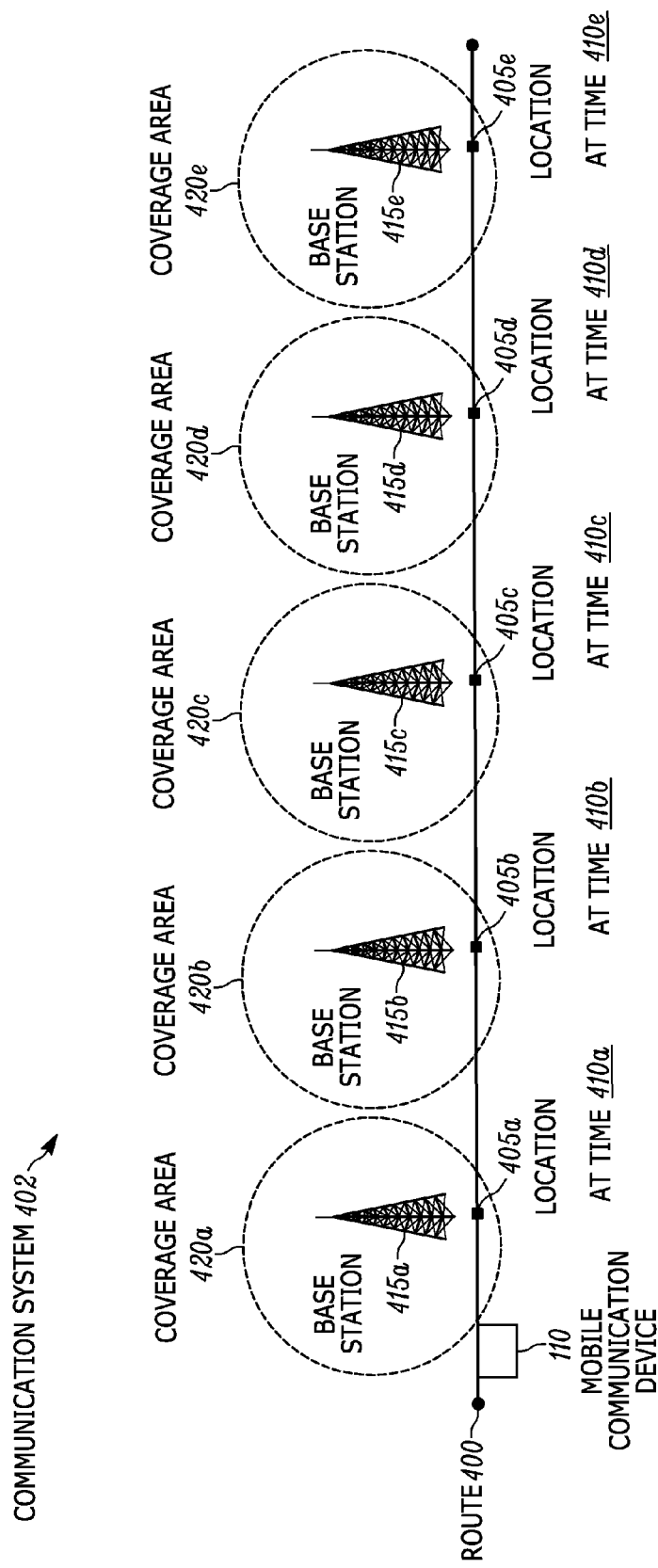
FIG. 5A is a block diagram of the communication system of FIG. 2 including a plurality of base stations in accordance with some embodiments.

FIG. 5A illustrates a block diagram of the communication system 402 including a plurality of base stations 415*a*, 415*b*, 415*c*, 415*d*, and 415*e* and an exemplary route 400 of the mobile communication device 110. In some embodiments, the communication system 402 incorporates operation similar to the communication system 100 of FIG. 2. In the illustrated embodiment, the route 400 includes an array of route locations 405*a*, 405*b*, 405*c*, 405*d*, and 405*e* and an array of times 410*a*, 410*b*, 410*c*, 410*d*, and 410*e*. However, in other embodiments, the route 400 may include more or less route locations and times. The mobile communication device 110 is located at a specific route location (e.g., 405*a*, 405*b*, 405*c*, 405*d*, or 405*e*) at a specific time (e.g., 410*a*, 410*b*, 410*c*, 410*d*, or 410*e*).

The route 400, including the array of route locations 405*a*, 405*b*, 405*c*, 405*d*, and 405*e* and the array of times 410*a*, 410*b*, 410*c*, 410*d*, and 410*e*, may be determined using a software application. For example, in one embodiment, the route 400 is determined by a software application executed by the mobile communication device 110. In another embodiment, the route 400 is determined by a firmware application executed by the mobile communication device 110. In some embodiments, the software application is a navigation application. In such an embodiment, the navigation application may use satellite navigation (e.g., global navigation satellite system (GNSS) tracking, global positioning system (GPS) tracking, or the like) and/or cellular telephone navigation (e.g., triangulation, network-based tracking, handset-based tracking, subscriber identification module (SIM) based tracking, WiFi-based tracking, etc.). In other embodiments, the route 400 is determined by a software application executed by an external device, such as but not limited to, a software application executed by an external computer or a web-based application. In other embodiments, the route 400 is determined by a firmware application executed by an external device.

The infrastructure controller 125 receives the route 400, for example, from the mobile communication device 110. Using, for example, locations 405*a*, 405*b*, 405*c*, 405*d*, and 405*e* of the route 400, the infrastructure controller 125 determines which coverage areas (e.g., coverage areas 420*a*, 410*b*, 420*c*, 420*d*, and 420*e*) the mobile communication device 110 will be in at times 410*a*, 410*b*, 410*c*, 420*d*, and 410*e*. In some embodiments, the infrastructure controller 125 continually receives updates and/or changes to the route 400 and adaptively determines what coverage areas the mobile communication device 110 will be traveling through based on those updates and/or changes. In the illustrated embodiment, while travelling along the route 400, the mobile communication device 110 will move in and out of coverage areas 420*a*, 420*b*, 420*c*, 420*d*, and 420*e* of base stations 415*a*, 415*b*, 415*c*, 415*d*, and 415*e*, respectively.

Using the coverage area information (e.g., the coverage area that the mobile communication device 110 will be in at specific locations and times of the route 400), the infrastructure controller 125 can determine what modulation schemes will be used at specific locations and times along the route 400. For example, in the illustrated embodiment, at location 405*a*, while in coverage area 120*a*, a sixty-four quadrature amplitude (QAM) scheme may be used. At location 405*b*, while in coverage area 420*b*, a sixteen quadrature amplitude (QAM) scheme may be used. At location 405*c*, while in coverage area 420*c*, a four quadrature phase-shift keying (QPSK) scheme may be used. At location 405*d*, while in coverage area 420*d*, a sixteen quadrature amplitude (QAM) scheme may be used. Finally, at location 405*e*, while in coverage area 420*e*, a sixty-four quadrature amplitude (QAM) scheme may be used.

The infrastructure controller 125 determines, modifies, and/or changes an allocation scheme 450 (FIG. 5B) in order to refine and, in some cases, optimize an amount of resources allocated to the communications link 112 between the mobile communication device 110 and the one or more base stations 415. The infrastructure controller 125 refines the allocation scheme based on the route 400, the one or more modulation schemes used along the route 400, and a guaranteed bit rate (e.g., 500 Kbps) of a required quality of service (QoS). By adjusting and refining the amount of resources in such a manner, the bit rate consumed by an application of the mobile communication device 110 may be substantially constant with respect to the guaranteed bit rate, while not having to match the air interface bit rate.

Figure 5B:
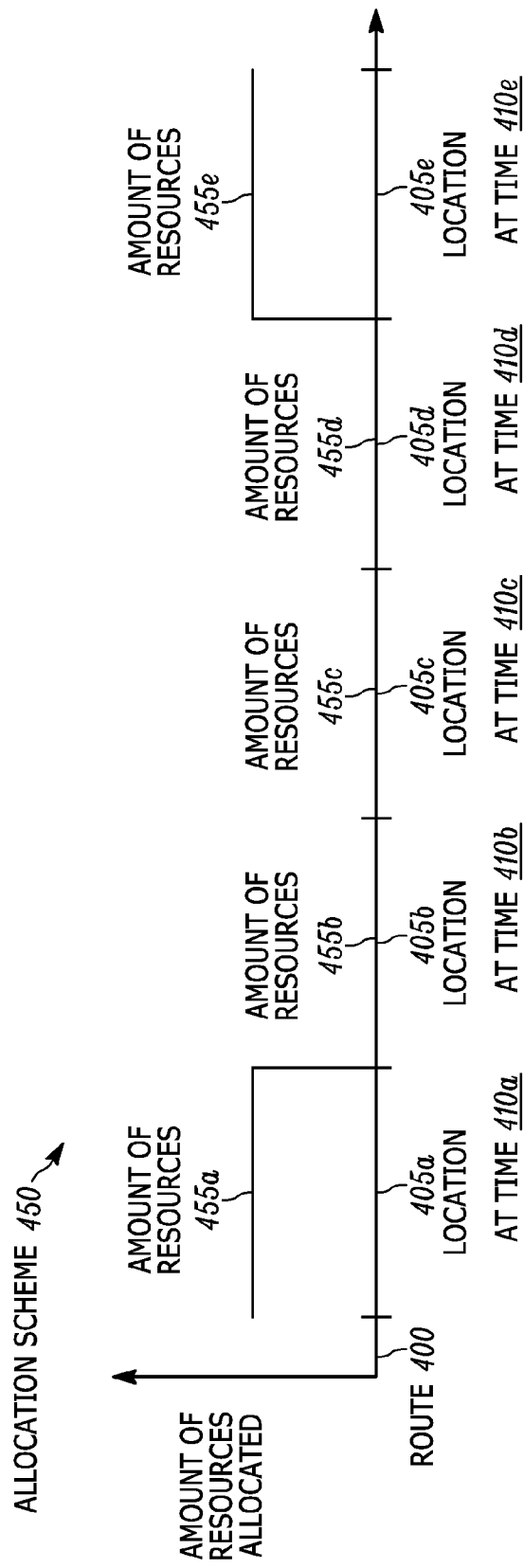
FIG. 5B is a chart illustrating an allocation scheme used in conjunction with the communication system of FIG. 5A in accordance with some embodiments.

FIG. 5B is a chart illustrating the exemplary allocation scheme 450 of the communication link 112 between the plurality of bases stations 415a, 415b, 415c, 415d, and 415e and the mobile communication device 110 along the route 400. The allocation scheme 450 is optimized based on the route 400, the modulation scheme used along the route, and a guaranteed bit rate of a required quality of service (QoS). As illustrated, the allocation scheme 450 allocates a first amount of resources 455a at location 405a, a second amount of resources 455b at location 405b, a third amount of resources 455c at location 405c, a fourth amount of resources 455d at location 405d, and a fifth amount of resources 455e at location 405e. By knowing the route 400, the modulation scheme used along the route, and the guaranteed bit rate, the air interface bit rate does not have to match the bit rate consumed by the application of the mobile communication device 110. Rather, in some embodiments, resources can be allocated at advantageous points, and not at all at non-advantageous points, while still meeting the guaranteed bit rate of the quality of service (QoS). Therefore, resources can be allocated only at locations 405a and 405e (e.g., when high modulation schemes are used), while a minimum amount of resources (e.g., substantially zero resources) are allocated at locations 405b, 405c, and 405d (e.g., when low modulation schemes are used).

Figure 6A:
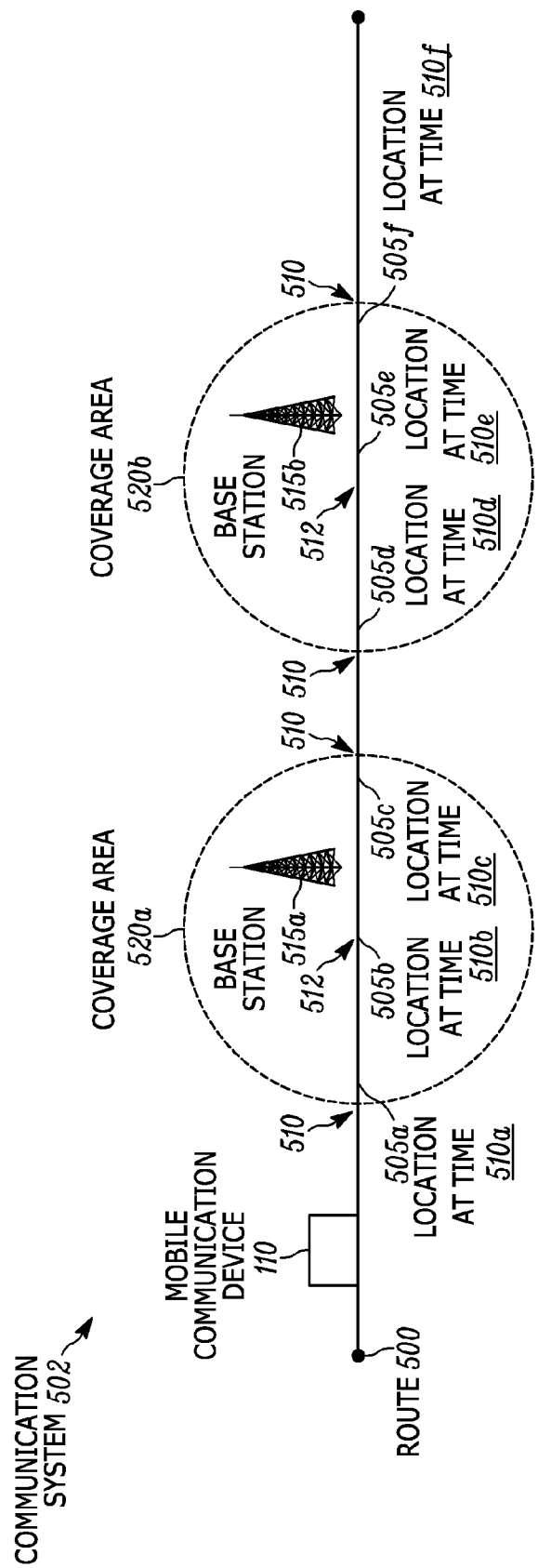
FIG. 6A is a block diagram of the communication system of FIG. 2 including a plurality of base stations in accordance with some embodiments.

FIG. 6A illustrates a block diagram of the communication system 502 including a plurality of base stations 515a, 515b, and 515c and an exemplary route 500 of the mobile communication device 110. In some embodiments, the communication system 502 incorporates operation similar to the communication system 100 of FIG. 2. In the illustrated embodiment, the route 500 includes route locations 505a, 505b, 505c, 505d, 505e, and 505f and times 510a, 510b, 510c, 510d, 510e, and 510f. In the illustrated embodiment, locations 505a, 505c, 505d, and 505f are located at a cell edge 510 (e.g., edge of a coverage area 520), while locations 505b and 505e are located at a cell middle 512 (e.g., substantially middle of a coverage area 520). However, in other embodiments, the route 400 may include more or fewer route locations and times.

Figure 6B:
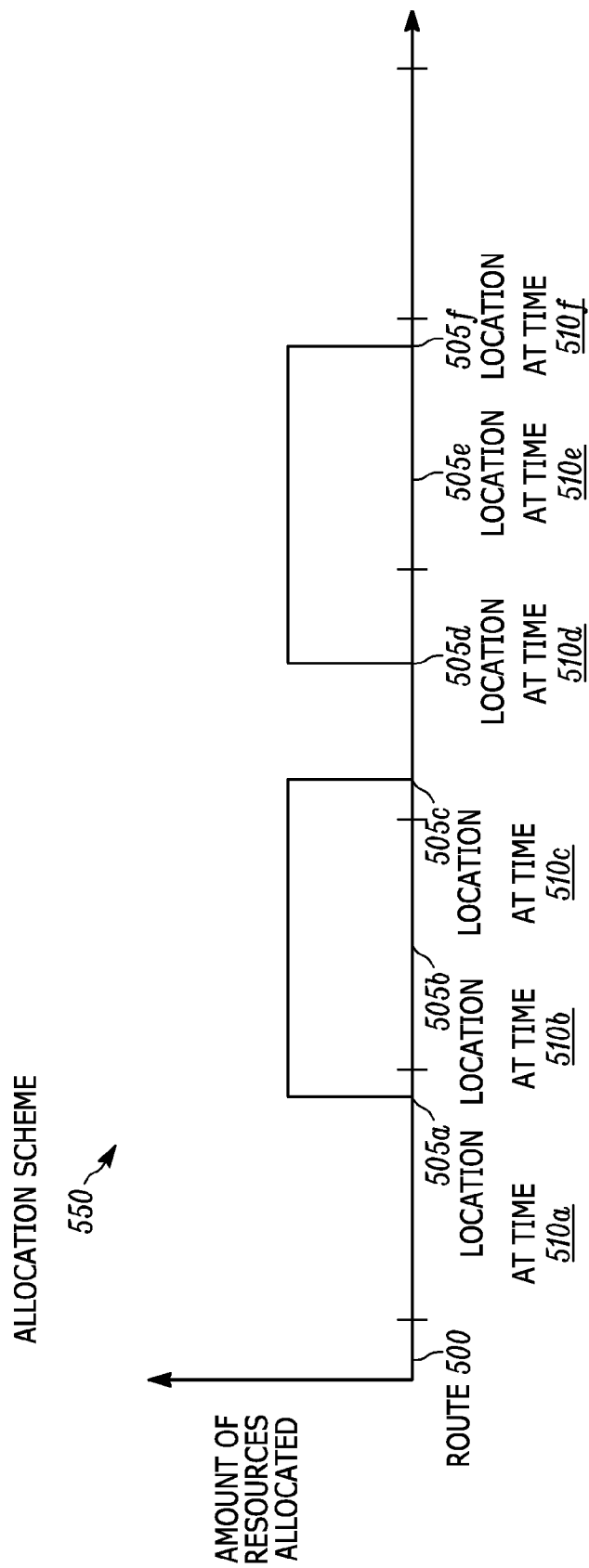
FIG. 6B is a chart illustrating an allocation scheme used in conjunction with the communication system of FIG. 6A in accordance with some embodiments.

FIG. 6B is a chart illustrating an exemplary allocation scheme 550 of the communication link (e.g., communication link 112) between bases stations 515a and 515b and the mobile communication device 110 along the route 500. Although, the allocation scheme 550 is optimized based on the route 500, the modulation scheme used along the route, and a guaranteed bit rate of a required quality of service (QoS), in the illustrated embodiment, the allocation scheme 550 may additionally be based on the location of the mobile communication device 110 relative to the coverage areas 520. In such an embodiment, the amount of resources allocated to the communication link when the mobile communication device 110 is located in the middle (e.g., cell middle 512) of the coverage area 520 may vary from the amount of resources allocated to the communication link when the mobile communication device 110 is located at an edge (e.g., cell edge 510) of the coverage areas 520. For example, in the illustrated embodiment, resources can be allocated only at locations 505b and 505e (e.g., when the mobile communication device 110 is located in the middle of the coverage areas of 520a, 520b), while a minimum amount of resources (e.g., no resources) are allocated at locations 505a, 505c, 505d, and 505f (e.g., when the mobile communication device 110 is located at the edges of the coverage areas of 520a, 520b). Such a method of determining the allocation scheme allows for resources to be allocated to the communication link in a more efficient manner, while still maintaining the guaranteed bit rate of the quality of service (QoS).

As discussed above, by knowing the route 400 of the mobile communication device 110, an allocation scheme can be determined or modified. Further, by knowing the route 400 of the mobile communication device 110, the infrastructure controller 125 also knows the modulation schemes which will be used along the route 400. As discussed above, using the modulation schemes along the route 400, along with a guaranteed bit rate of the quality of service (QoS), the allocation scheme can be determined or modified such that the air interface bit rate does not have to match the consumed bit rate.

Figure 7:
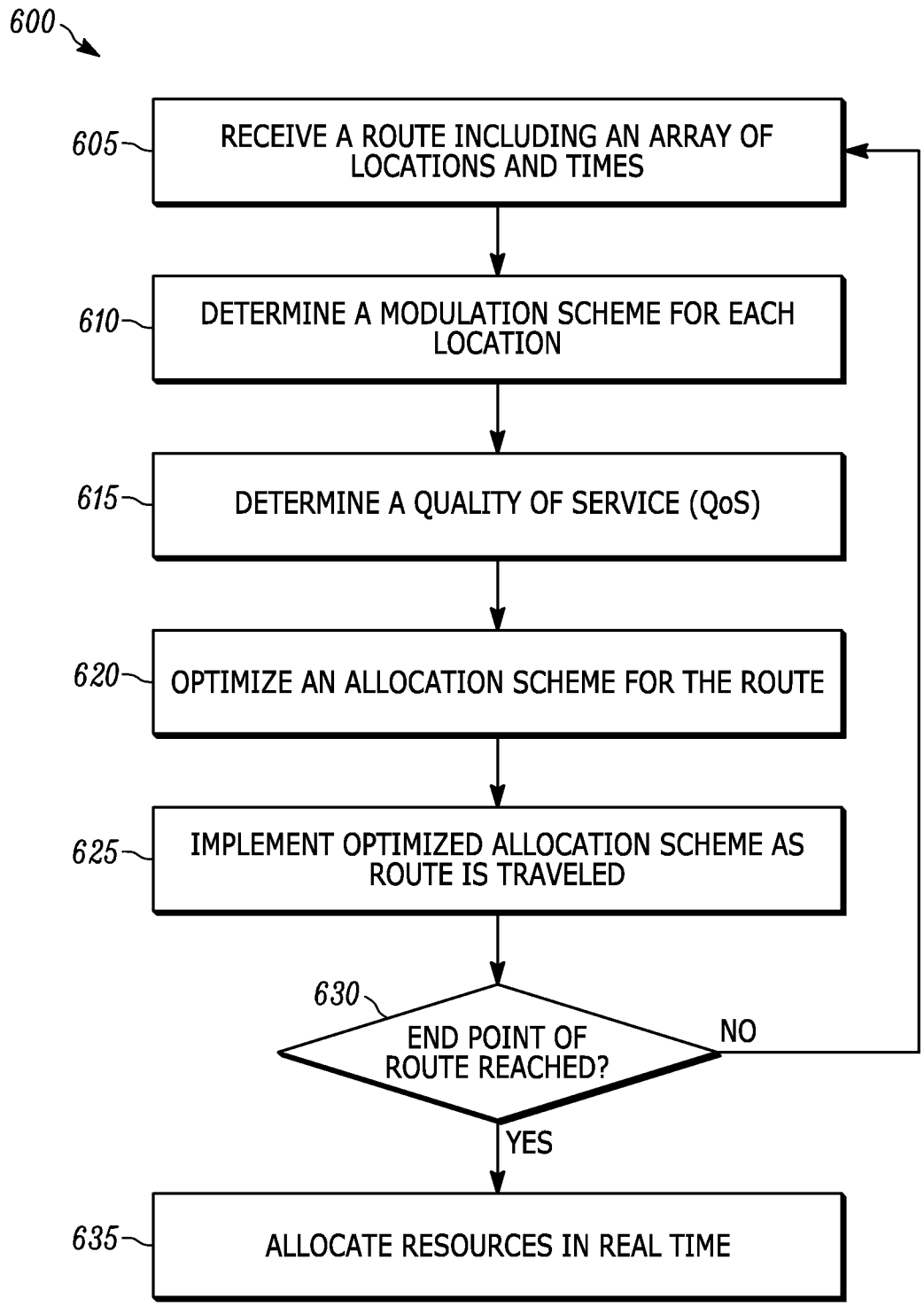
FIG. 7 is a flowchart illustrating a method of operating the communication system of FIG. 2 in accordance with some embodiments.

FIG. 7 is a flowchart illustrating a method 600 of determining an allocation scheme according to some embodiments. Although method 600 is illustrated as being performed using the infrastructure controller 125, the method 600 may be performed using other electronic processors or similar devices. The infrastructure controller 125 receives a route including an array of locations and times (Block 605). The infrastructure controller 125 determines a modulation scheme for each location of the array of locations (Block 610). The infrastructure controller 125 determines a quality of service (QoS) having a guaranteed bit rate (Block 615). The infrastructure controller 125 optimizes an allocation scheme based on at least the route, the modulation schemes, and the quality of service (QoS) (Block 620). The infrastructure controller 125 allocates resources to a communication link (e.g., the communication link 112) according to the optimized allocation scheme as the mobile communication device 110 travels along the route (Block 625). The infrastructure controller 125 determines, by using the location of the mobile communication device 110, if the mobile communication device 110 has reached the end of the route (Block 630). If the mobile communication device 110 has not reached the end of the route, method 600 cycles back to Block 605 to receive any updates and/or changes to the route. If the device has reached the end of the route, the method 600 proceeds to Block 635. The resources are then allocated in real time (e.g., the air interface bit rate must match the bit rate consumed by the application of the mobile communication device 110) (Block 635). As discussed above, in the embodiment illustrated, the allocation scheme includes an amount of resources allocated at every location of the mobile communication device 110 along the route. In some embodiments, the amount of resources is allocated differently along the route. By knowing the route of the mobile communication device 110, the infrastructure controller 125 can optimize the allocation scheme so that the bit rate consumed by the mobile communication device 110 stays constant with respect to the guaranteed bit rate according to the quality of service (QoS). As a consequence, the bit rate consumed by the mobile communication device 110 does not need to match the air interface bit rate of the communications link.

In some embodiments, the allocation scheme may be optimized using an algorithm. For example, the allocation scheme may use a linear programming algorithm to optimize the allocation scheme based on the route of the device, modulation schemes used along route, and the quality of service (QoS).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a communication system that includes a plurality of base stations, the method comprising:
    receiving a route, the route including an array of locations and times;
    determining a plurality of modulation schemes by determining at least one modulation scheme for each of the plurality of base stations;
    determining a quality of service having a guaranteed bit rate; and
    determining an allocation scheme based on the route, at least one of the plurality of modulation schemes, and the guaranteed bit rate;
    wherein determining the allocation scheme includes allocating an amount of resources such that a consumed bit rate is constant with respect to the guaranteed bit rate and an air interface bit rate does not match the consumed bit rate.

2. The method of claim 1, wherein the allocation scheme includes allocating no resources at least one location of the route.

3. The method of claim 1, wherein the operation of determining the allocation scheme includes allocating a first quantity of resources at a first location and allocating a second quantity of resources at a second location.

4. The method of claim 1, wherein the operation of determining the allocation scheme includes allocating a first quantity of resources at one or more locations near the middle of at least one coverage area of the plurality of base stations and allocating a second quantity of resources at one or more locations near the edge of the at least one coverage area of the plurality of base stations.

5. The method of claim 1, wherein the resources are allocated to a communication link between at least one base station and a mobile communication device.

6. The method of claim 1, wherein the operation of receiving the route includes receiving the route from a navigation application.

7. The method of claim 6, wherein the navigation application is executed on a mobile communication device.

8. A non-transitory computer-readable medium containing instructions that, when executed by an electronic processor, perform a set of functions comprising:
receiving a route, the route including an array of locations and times;
determining a plurality of modulation schemes by determining at least one modulation scheme for each of the plurality of base stations;
determining a quality of service having a guaranteed bit rate; and
determining an allocation scheme based on the route, at least one of the plurality of modulation schemes, and the guaranteed bit rate;
wherein determining the allocation scheme includes allocating an amount of resources such that a consumed bit rate is constant with respect to the guaranteed bit rate and an air interface bit rate does not match the consumed bit rate.

9. The non-transitory computer-readable medium of claim 8, wherein the allocation scheme includes allocating no resources at least one location of the route.

10. The non-transitory computer-readable medium of claim 8, wherein the function of determining the allocation scheme includes allocating a first quantity of resources at a first location and allocating a second quantity of resources at a second location.

11. The non-transitory computer-readable medium of claim 8, wherein the function of determining the allocation scheme includes allocation a first quantity of resource at one or more locations near the middle of at least one coverage area of the plurality of base stations and allocating a second quantity of resources at one or more locations near the edge of the at least one coverage area of the plurality of base stations.

12. The non-transitory computer-readable medium of claim 8, wherein the resources are allocated to a communication link between at least one base station and a mobile communication device.

13. The non-transitory computer-readable medium of claim 8, wherein the function of receiving the route includes receiving the route from a navigation application.

14. A communication network management controller comprising:
a transceiver;
an electronic processor electrically coupled to the transceiver; and
a memory electrically coupled to the electronic processor and containing instructions that, when executed by the electronic processor, perform a set of functions including
receiving a route, the route including an array of locations and times corresponding to a mobile device utilizing the route;
determining a plurality of modulation schemes by determining at least one modulation scheme for each of the plurality of base stations;
determining a quality of service having a guaranteed bit rate; and
determining an allocation scheme based on the route, at least one of the plurality of modulation schemes, and the guaranteed bit rate;
wherein determining the allocation scheme includes allocating an amount of resources such that a consumed bit rate is constant with respect to the guaranteed bit rate and an air interface bit rate does not match the consumed bit rate.

15. The communication network management controller of claim 14, wherein the allocation scheme includes allocating no resources at at least one location of the route.

16. The communication network management controller of claim 14, wherein the function of determining the allocation scheme includes allocating a first quantity of resources at a first location and allocating a second quantity of resources at a second location.

17. The communication network management controller of claim 14, wherein the function of determining the allocation scheme includes allocation a first quantity of resource at one or more locations near the middle of at least one coverage area of the plurality of base stations and allocating a second quantity of resources at one or more locations near the edge of the at least one coverage area of the plurality of base stations.

18. The communication network management controller of claim 14, wherein the resources are allocation to a communication link between at least one base station and a mobile communication device.

19. The communication network management controller of claim 14, wherein the function of receiving the route includes receiving the route from a navigation application.

20. The communication network management controller of claim 19, wherein the navigation application is executed on a mobile communication device.

* * * * *